US008667191B2

(12) United States Patent
Tang et al.

(10) Patent No.: US 8,667,191 B2
(45) Date of Patent: Mar. 4, 2014

(54) MANAGING AND INDENTIFYING MULTIPLE MEMORY STORAGE DEVICES

(75) Inventors: Choon-Tak Tang, Irvine, CA (US); Chin-Tang Yen, Kaohsiung (TW); Ngoc Le, Irvine, CA (US); David Sun, Fountain Valley, CA (US)

(73) Assignee: Kingston Technology Corporation, Fountain Valley, CA (US)

( * ) Notice: Subject to any disclaimer, the term of this patent is extended or adjusted under 35 U.S.C. 154(b) by 406 days.

(21) Appl. No.: 12/688,792

(22) Filed: Jan. 15, 2010

(65) Prior Publication Data

US 2011/0179369 A1   Jul. 21, 2011

(51) Int. Cl.
*G06F 13/00* (2006.01)
*G06F 13/36* (2006.01)
*G06F 13/20* (2006.01)

(52) U.S. Cl.
USPC ........... 710/100; 710/110; 710/300; 710/306; 710/313; 710/314; 710/315; 710/316

(58) Field of Classification Search
USPC .......................... 710/300, 110, 306, 313–316
See application file for complete search history.

(56) References Cited

U.S. PATENT DOCUMENTS

| | | | | |
|---|---|---|---|---|
| 5,721,877 A | * | 2/1998 | Heflinger et al. | 711/163 |
| 6,092,170 A | * | 7/2000 | Kori | 711/202 |
| 6,272,644 B1 | * | 8/2001 | Urade et al. | 713/320 |
| 6,324,627 B1 | * | 11/2001 | Kricheff et al. | 711/163 |
| 6,615,312 B1 | * | 9/2003 | Hamlin et al. | 711/112 |
| 6,678,812 B1 | * | 1/2004 | Begis et al. | 711/171 |
| 6,742,080 B1 | * | 5/2004 | Grimsrud et al. | 711/112 |
| 7,496,493 B1 | * | 2/2009 | Stevens | 703/24 |
| 7,657,665 B2 | * | 2/2010 | Dalton et al. | 710/5 |
| 2002/0076950 A1 | * | 6/2002 | Frostrom et al. | 439/49 |
| 2002/0108023 A1 | * | 8/2002 | Constable et al. | 711/163 |
| 2003/0177294 A1 | * | 9/2003 | Russell | 710/62 |
| 2004/0148450 A1 | * | 7/2004 | Chen et al. | 710/313 |

(Continued)

FOREIGN PATENT DOCUMENTS

| | | |
|---|---|---|
| CN | 1609832 A | 4/2005 |
| CN | 101021825 A | 8/2007 |

(Continued)

OTHER PUBLICATIONS

Weijun Xiao; Xiaoqiang Lei; Ruixuan Li; Nohhyun Park; Lilja, D.J., "PASS: A Hybrid Storage System for Performance-Synchronization Tradeoffs Using SSDs," Parallel and Distributed Processing with Applications (ISPA), 2012 IEEE 10th International Symposium on , pp. 403,410, Jul. 10-13, 2012.*

(Continued)

*Primary Examiner* — Faisal M Zaman
(74) *Attorney, Agent, or Firm* — Sawyer Law Group, P.C.

(57) ABSTRACT

A management hub is disclosed. The management hub comprises an interface; a master hub controller coupled to the interface; a plurality of ports coupled to the master hub controller; a microcontroller coupled to the master hub controller; and hub setting switch and a slave hub controller coupled to the microcontroller and the plurality of ports. The management hub also includes a memory device coupled to the microcontroller, the memory device including a hidden drive information partition and a hidden drive organizer partition for managing and identifying information in various drives coupled to the plurality of ports, wherein when the management hub is first connected to a host system the drives are displayed in an inactive state.

8 Claims, 7 Drawing Sheets

(56) References Cited

U.S. PATENT DOCUMENTS

| | | | |
|---|---|---|---|
| 2005/0021847 A1* | 1/2005 | Rothman et al. | 709/238 |
| 2005/0169061 A1* | 8/2005 | Sohn et al. | 365/189.03 |
| 2005/0264987 A1* | 12/2005 | Krancher et al. | 361/683 |
| 2006/0026333 A1* | 2/2006 | Parr et al. | 710/313 |
| 2006/0294307 A1* | 12/2006 | Summers et al. | 711/115 |
| 2007/0204023 A1* | 8/2007 | Ohta | 709/223 |
| 2007/0266203 A1* | 11/2007 | Amano et al. | 711/111 |
| 2007/0291571 A1* | 12/2007 | Balasundaram | 365/227 |
| 2008/0005415 A1* | 1/2008 | Lopez et al. | 710/62 |
| 2008/0010401 A1* | 1/2008 | Royer et al. | 711/113 |
| 2008/0082752 A1* | 4/2008 | Chary et al. | 711/118 |
| 2009/0240873 A1* | 9/2009 | Yu et al. | 711/103 |
| 2009/0307389 A1* | 12/2009 | Sprouse et al. | 710/36 |
| 2009/0327576 A1* | 12/2009 | Oshins | 711/6 |
| 2010/0042782 A1* | 2/2010 | Grynberg | 711/115 |
| 2011/0040904 A1* | 2/2011 | Sivertsen | 710/51 |
| 2011/0119418 A1* | 5/2011 | Barron et al. | 710/106 |

FOREIGN PATENT DOCUMENTS

| | | | | |
|---|---|---|---|---|
| CN | 101086726 A | | 12/2007 | |
| JP | 2003008681 A | * | 1/2003 | H04L 29/06 |
| JP | 2004213657 A | * | 7/2004 | G06F 12/06 |
| JP | 2007164915 A | * | 6/2007 | G11B 20/10 |
| JP | 2007226640 A | * | 9/2007 | G06F 12/16 |
| JP | 2008090477 A | * | 4/2008 | G06F 12/16 |
| JP | 2008152776 A | * | 7/2008 | G06F 21/22 |
| JP | 2009245216 A | * | 10/2009 | G06F 9/48 |

OTHER PUBLICATIONS

Nakane, K.; Otsuka, I.; Esumi, K.; Divakaran, A.; Murakami, T., "A content-based browsing system for a HDD and/or recordable-DVD personal video recorder," Consumer Electronics, 2003. ICCE. 2003 IEEE International Conference on , pp. 26,27, Jun. 17-19, 2003.*

Linksys ProConnect USB 4-Port Hub Hub—4 ports; 4 pages; http://www.google.com/products/catalog?q=linksys+usb+hub&hl=en&cid=15910497737742063017&sa=title#p.

* cited by examiner

400

MANAGING AND INDENTIFYING MULTIPLE MEMORY STORAGE DEVICES

FIELD OF THE INVENTION

The present invention relates generally to memory storage devices and more specifically to the management and identification of such devices.

BACKGROUND OF THE INVENTION

There are a variety of environments where memory devices are coupled to a host system to allow for the display of their contents on the screen of the host device. The memory device such as a USB device can be directly coupled onto the host system through a connector. When it is desired that several of the memory devices be connected to the host system a hub is utilized. A typical hub is a standard 4-port USB hub but there are other types of hubs as well.

This type of hub cannot be managed in terms of individual ports. That is, when a USB device is inserted to the USB port, it is automatically detected by the OS. Application programs will pop-up on the computer screen, and these can be accessed by users.

This can be problematic in a couple of areas. First as the number of devices connected to the hub increases, the user might want to know what is on the hub before it is launched. To be able to identify what is on each device would be helpful in managing and organizing the information. Furthermore, there may be, for example malicious viruses, malware or the like on a particular memory device that is connected to the hub. Therefore minimizing the launching of such applications onto the host system is also highly desirable.

Accordingly what is needed is a system and method that identifies the above-identified issues. The system and method should be cost effective, easily implemented and adaptable to existing environments. The present invention addresses such a need.

SUMMARY OF THE INVENTION

A management hub is disclosed. The management hub comprises an interface; a master hub controller coupled to the interface; a plurality of ports coupled to the master hub controller; a microcontroller coupled to the master hub controller; and a slave hub controller coupled to the microcontroller and the plurality of ports. The management hub also includes a memory device coupled to the microcontroller, the memory device including a hidden drive information partition and a hidden drive organizer partition for managing and identifying information in various drives coupled to the plurality of ports, wherein when the management hub is first connected to a host system the drives are displayed in an inactive state.

A system and method in accordance with the present invention manages and identifies multiple flash memory storage devices that are inserted into a management hub in the following ways:

(1) Isolating each Flash memory storage device in an "Inactive State" so it is only visible to the host PC through the—Drive Organizer Management Console (DOMC) from the management hub, thus blocking "OS" from the host PC from accessing the flash memory storage device.

(2) Allowing each Flash memory storage device to be placed in an "Active State" where the device can be enumerated by the host PC and accessed by any application such as Windows Explorer.

(3) Easily updating and viewing the device name.

(4) Supporting a memo for adding description to each device. This memo is stored in the onboard memory and can be easily viewed and updated by the user. Each memo is uniquely associated to the corresponding flash memory storage device.

(5) Easily launch the Windows Explorer application. Double clicking on any of the flash memory storage devices in the DOMC that are in the Active State will launch Windows Explorer to the corresponding device.

(6) A casing can also be used to store the management hub and at least one flash memory storage device.

DETAILED DESCRIPTION

The present invention relates generally to memory storage devices and more specifically to management and identification of such devices. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A system that utilizes a management hub in accordance with the present invention can take the form of an implementation of entirely hardware, entirely software, or may be an implementation containing both hardware-based and software-based elements. In one implementation, this disclosure is implemented in software, which includes, but is not limited to, application software, firmware, resident software, program application code, microcode, etc.

Furthermore, a management hub of the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device. Further a computer-readable medium includes the program instructions for performing the steps of the present invention. In one implementation, a computer-readable medium preferably carries a data processing or computer program product used in a processing apparatus which causes a computer to execute in accordance with the present invention. A software driver comprising instructions for execution of the present invention by one or more processing devices and stored on a computer-readable medium is also envisioned.

The medium can be an electronic, magnetic, optical, electromagnetic, infrared, or semiconductor system (or apparatus or device) or a propagation medium, or a signal tangibly embodied in a propagation medium at least temporarily stored in memory. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk—read/write (CD-R/W).

Figure 1:
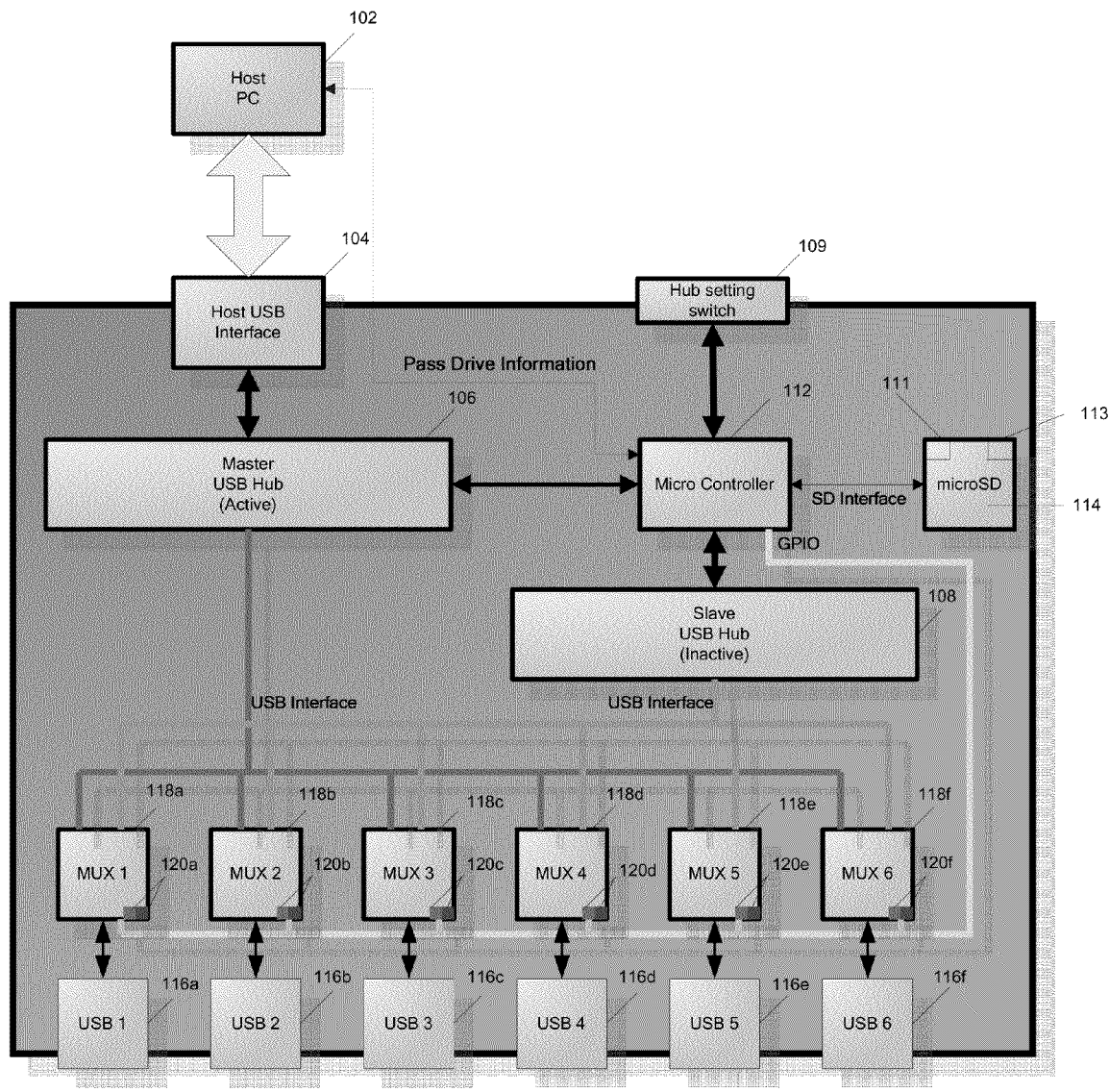
FIG. 1 is a block diagram of a management hub in accordance with an Embodiment.

FIG. 1 is a block diagram of an embodiment of the management hub 100, in this case a six port embodiment. However, note that the management hub can be any size of port configuration. The management hub 100 contains one master hub controller 106 and one slave hub controller 108. The master hub controller 106 is connected to a micro controller 112, which is connected to a hub setting switch 109 and microSD or onboard flash memory 114 (the onboard flash memory 114 can be any kind of storage device). This onboard flash memory 114 also contains a hidden read/write partition 111 for storing drive related data, and a hidden Drive Organizer Management Console (DOMC) partition 113 for managing and identifying the information in the various drives connected to the management hub. The hub setting switch 109 is used for setting the hub configuration. If it is set for managed hub, it will check to see if the device connected to the hub 100 is an HID device, e.g. keyboard, mouse, webcam. If the drive is not an HID device, then the drive is in the inactive mode. If the switch 109 is set for unmanaged hub, then the DOMC is bypassed, and the drive is always in the active mode.

Each of the six ports 116a-116f is coupled to a multiplexer 118a-118f. Each of the ports 116a-116f can also be coupled to a drive and/or hub 100. Each of the six ports 116a-116f has a status light emitting diode (LED) 120a-120f. In one embodiment, the status LEDs 120a-120f indicate the following states of the device:

| | |
|---|---|
| Active | LED illuminated GREEN |
| Active-Transfer | LED illuminated BLINKING GREEN |
| Inactive | LED illuminated RED |
| Drive Not Present | LED OFF |

By default, each management hub will assume the name, such as DT Organizer, and can be modified by users. The name is stored in the hidden area of the onboard flash memory 114 and is displayed at the top of the DOMC 113. Right clicking on the name in the DOMC 113 allows the user to edit the name of the management hub 100. This allows for easier management when multiple management hubs 100 are connected to the same host PC 102.

Figure 2A:
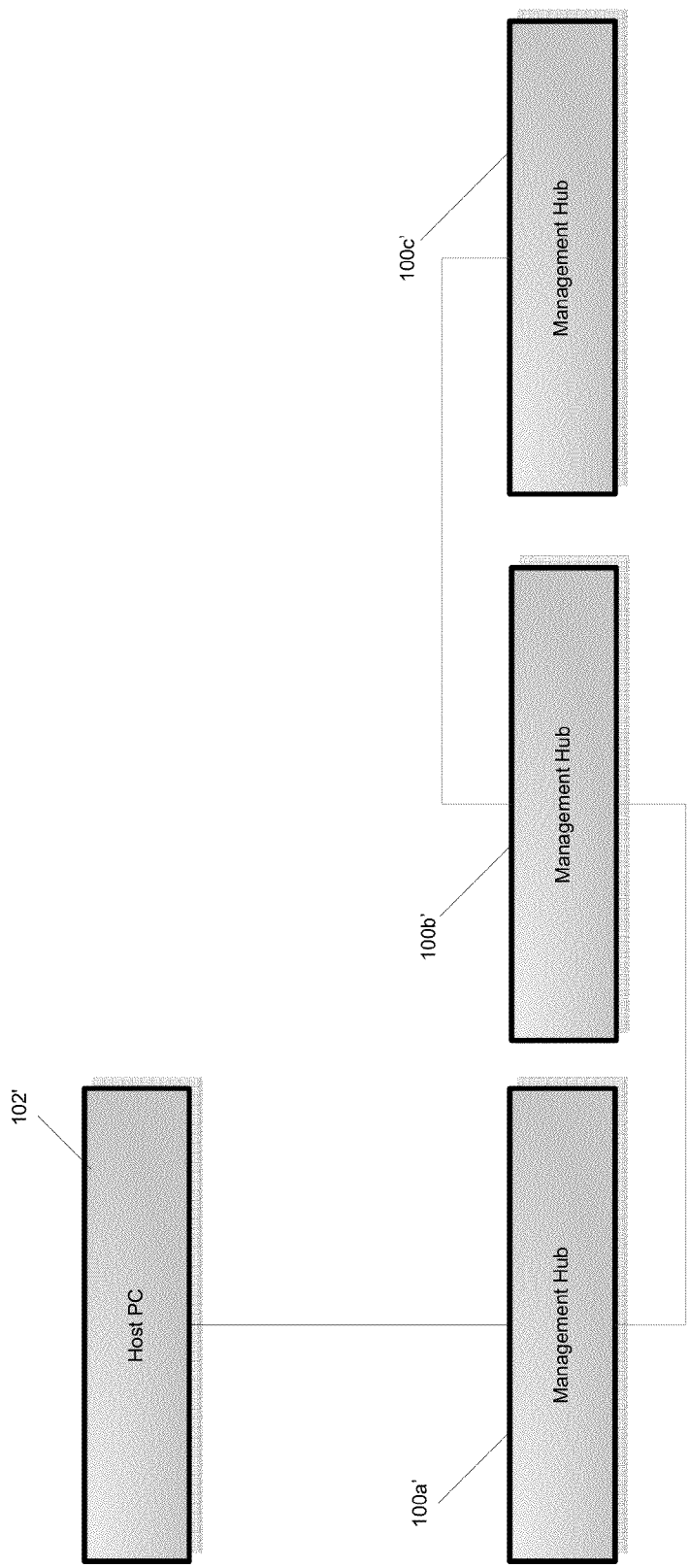
FIG. 2A illustrates a cascade/serial connection of management hubs.

The management hub 100 can support other multiple management hubs in a cascading/serial connection. FIG. 2a illustrates a cascade/serial connection of management hubs 100a', 100b' and 100c'. Both the management hub 100a'-100c' and DOMC must support at least one single level cascading of management hubs 100a'-100c'. Software identifies the ports by the "top port number" "−" the "lower port number". For example, if a management hub is connected to port 2 of another management hub, and a flash memory storage device is connected to port 3 of the lower management hub, the drive port will be identified as: "Port 2 -3".

Double clicking on a port that has another management hub connected causes the DOMC to set focus to that management hub connected to that port.

Figure 2B:
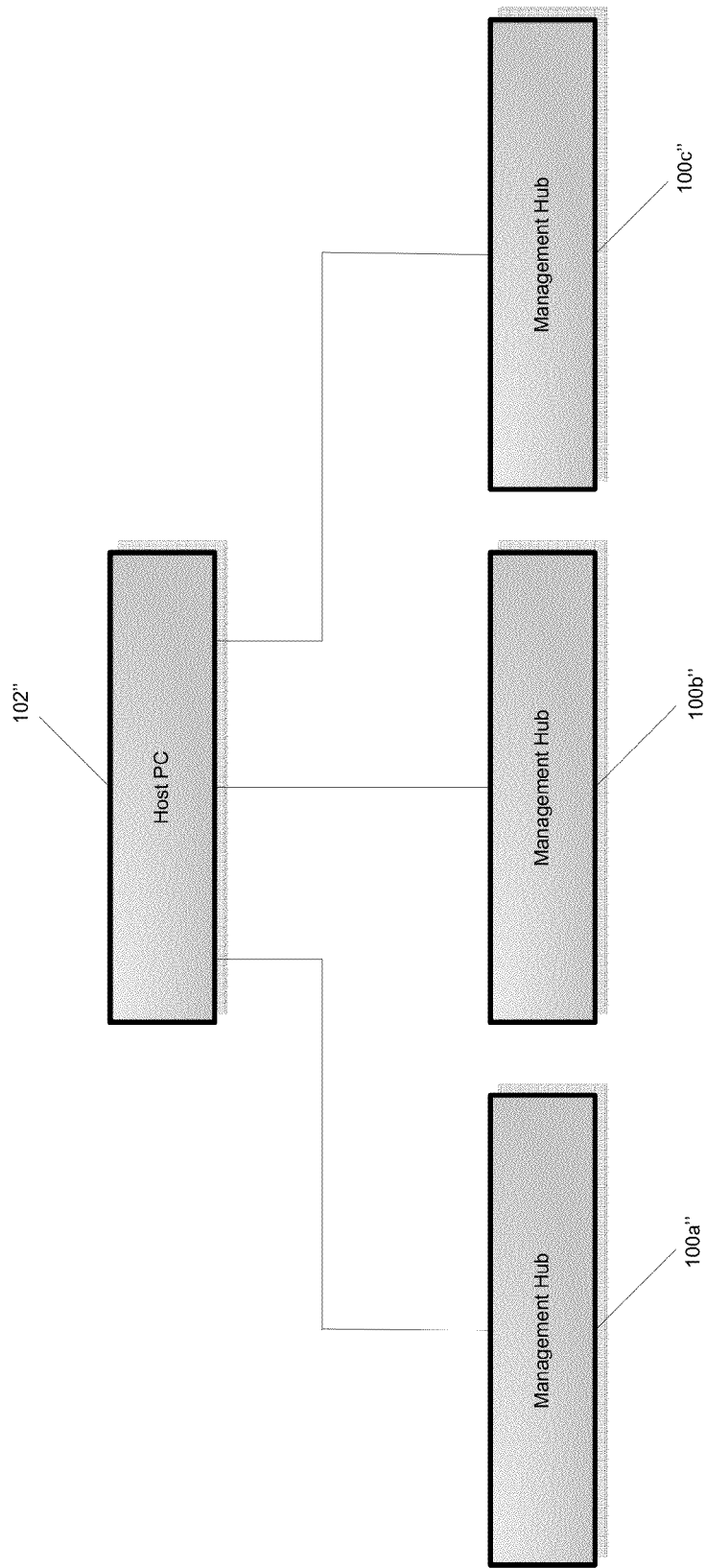
FIG. 2B illustrates a parallel connection of management hubs.

The management hub can also support multiple management hubs 100a"-100c' in a parallel connection with the host computer 102". FIG. 2b illustrates a parallel connection of management hubs 100a"-100c". The DOMC will allow for at least 2 independent management hubs to be connected to the host system 102" through independent ports.

If multiple management hubs are connected, either independently or by cascading, clicking on the DOMC in the system tray displays a popup with all the names of the management hubs 100a"-100c" or 100a'-100c'. Clicking on a particular name sets the DOMC to focus on that particular flash memory storage device.

Figure 3:
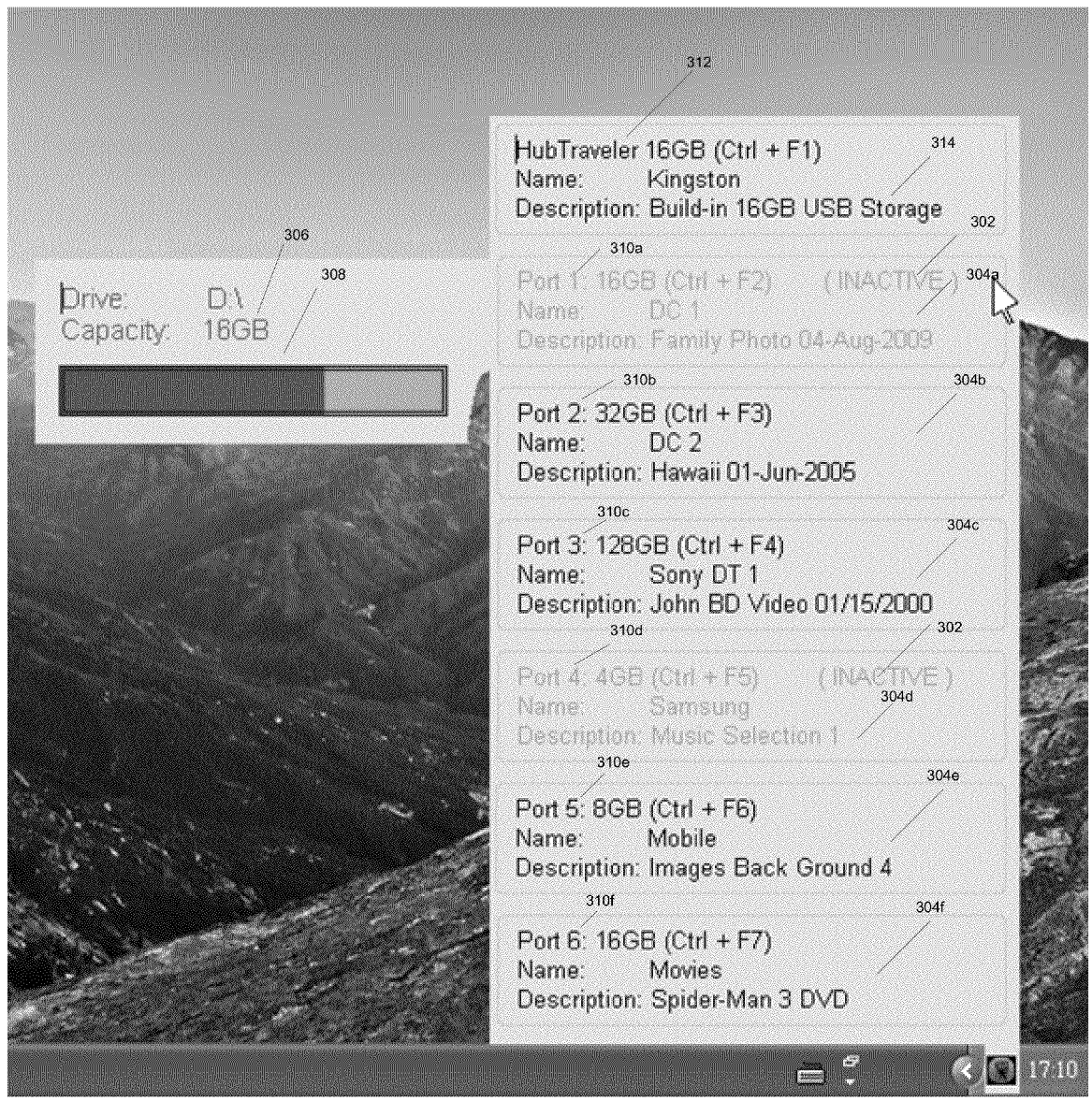
FIG. 3 is a diagram illustrating the launching of a Drive Organizer Management Console (DOMC).

FIG. 3 is a diagram illustrating the launching of a DOMC 300. When the management hub is first connected to a PC, the DOMC 300 can be launched by clicking on the application. If the application is closed by clicking the "X", it remains active in the system tray. Any flash memory storage devices that are connected to the management hub are displayed in the DOMC 300 in inactive state 302.

The DOMC 300 shows all six ports 304a-304f. When the left click is activated, the drive capacity 306 and usage 308 is displayed. Inactive drives 302 are gray-out and displayed as gray (or any other colors) drive 1 and drive 4, in this example. For each drive, the port number 310a-310f is displayed. The volume label is displayed in the name field 312. A portion of the drive description 314 is displayed in the description field. The description is the memo field.

If a drive is removed, the DOMC 300 software identifies the port as Drive Not Present Any subsequent connections of a flash memory storage device to the management hub show the device as Inactive and the DOMC 300 is updated. Whether the drive is active or inactive, the user is always able to read and modify the drive volume and descriptive field through the DOMC 300. Third party flash memory storage devices function with the same behavior as company flash memory storage devices, such as those manufactured by Kingston when connected to any of the six ports of the management hub. Non-storage devices function normally as if they were connected to standard ports. Windows Explorer or any other application sees and accesses only the active drives. The DOMC 300 software can also be launched by navigating to the read-only partition by clicking on the application.

Management Hub Naming

By default each management hub will assume a name such as, for example, DT Organizer, and can be modified by users. This name is stored in the hidden area of the onboard flash memory and is displayed at the top level of the DOMC 300. Right clicking on the name in the DOMC 300 allows the user to edit the name of the management hub. This allows for easier management when multiple management hubs are connected to the same host PC.

Double clicking on a port that has another management hub connected will cause the DOMC 300 to set focus to that management hub connected to that port.

For multiple management hubs in parallel connection with the host computer, the DOMC 300 allows for at least two independent management hubs connected to the host system through independent ports.

If multiple management hubs are connected, either in parallel or by cascading/serial, clicking on the DOMC 300 in the system tray displays a popup with all the names of the management hubs. Clicking on a particular name sets the DOMC 300 to focus to that device.

Figure 4:
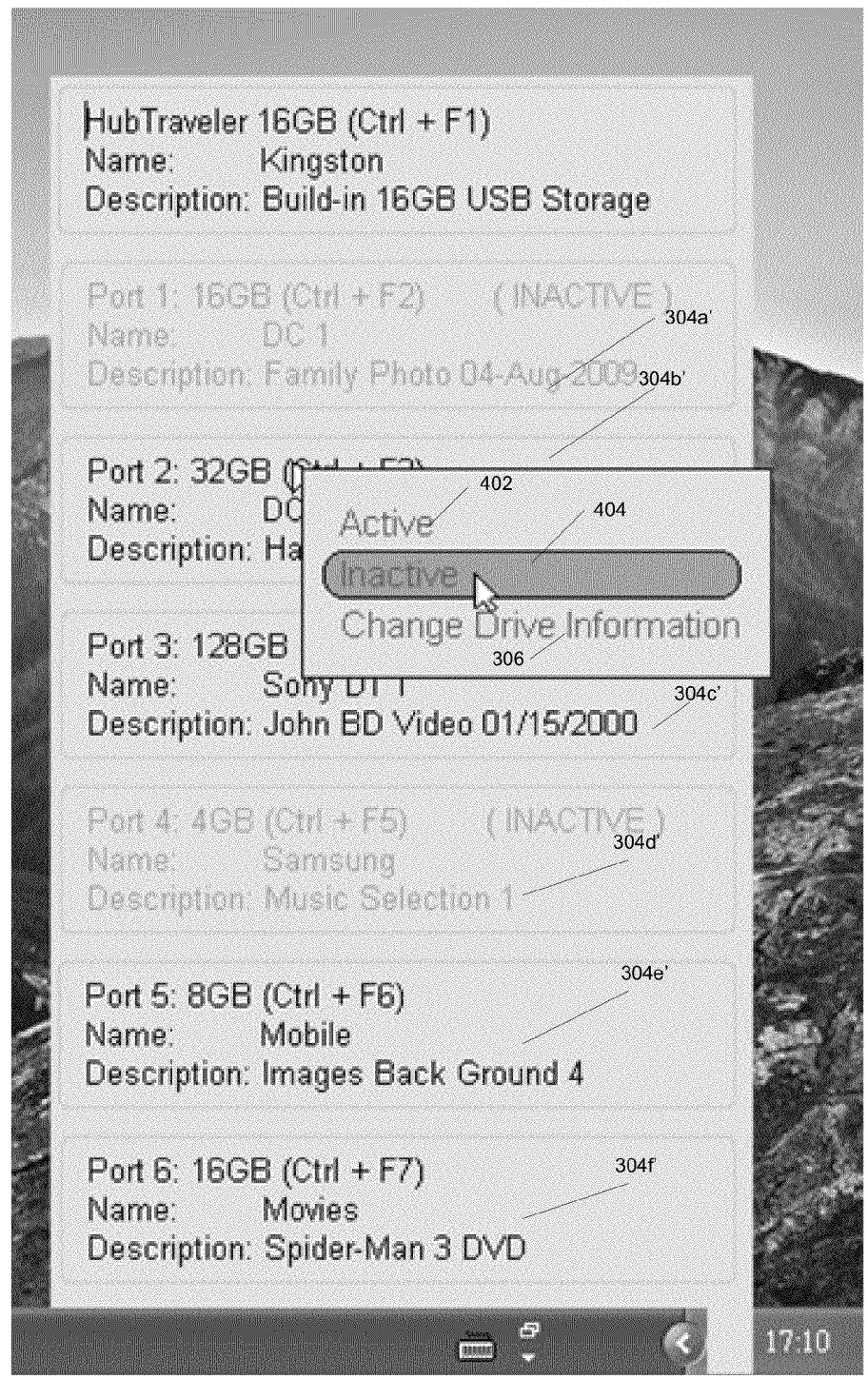
FIG. 4 illustrates the pop-up menu from the DOMC.

FIG. 4 illustrates a pop-up menu from the DOMC 300. When right clicking on a corresponding device, it displays a pop-up menu with the options to place the drive in an Active State 402 (drives 304b', 304c', 304e', 304f'), Inactive State 404 (drives 304a' and 304d'), or it displays a dialog box to alter the device volume label 306 or description field (not shown).

Figure 5:
FIG. 5 illustrates the "Change Drive Information" menu option from the dialog box.

FIG. 5 illustrates the "Change Drive Information" menu option 400 from the dialog box. The Change Drive Information menu option 400 allows for editing the drive volume label 420 and description 422'.

Figure 6:
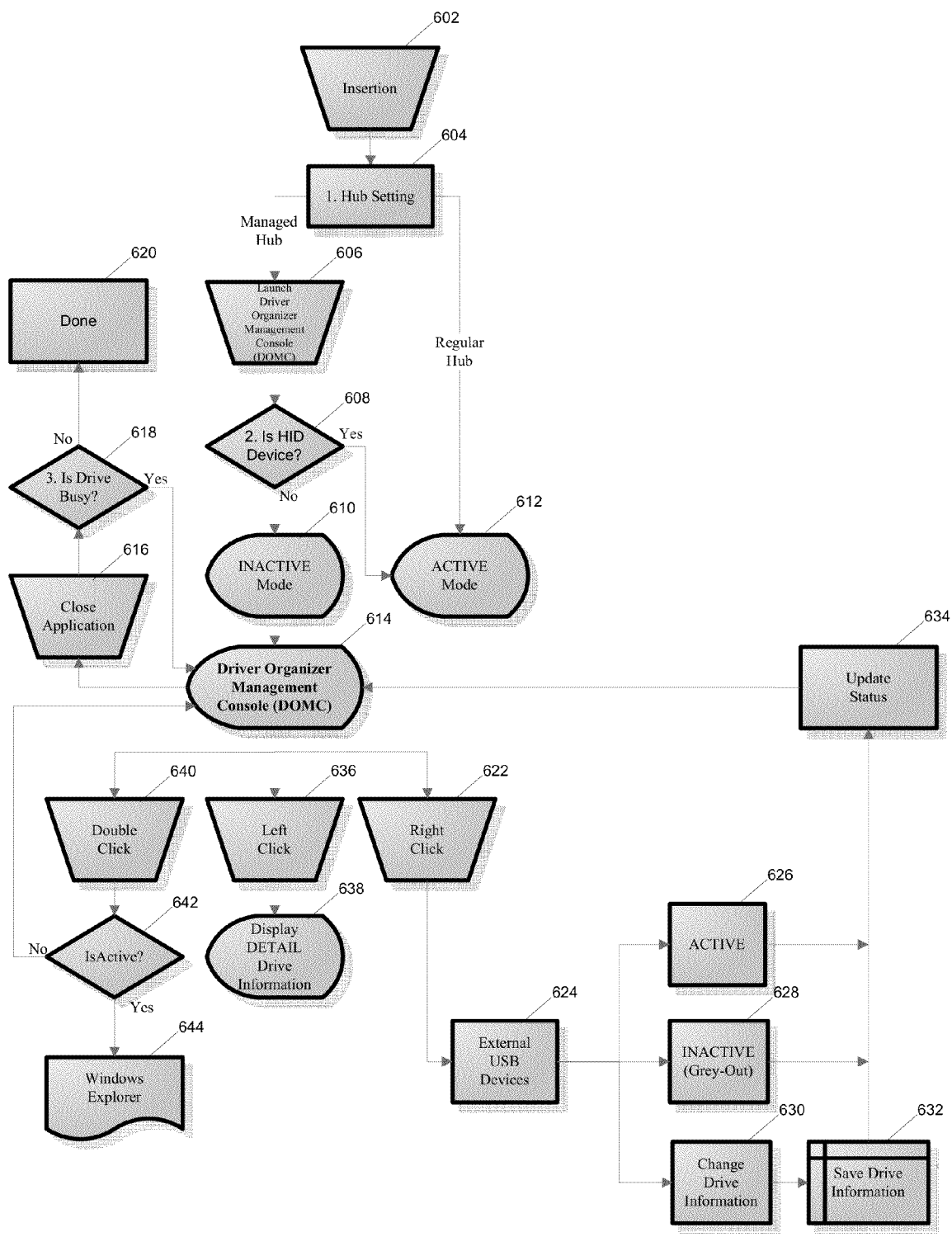
FIG. 6 illustrates the state diagram describing the software behavior.

FIG. 6 illustrates the state diagram 600 describing the software behavior. When one of the flash memory storage devices are inserted into the management hub via step 602, depending on the hub setting from DOMC, via step 604, if it is set for a managed hub via step 606, it will check to see if it is an HID device via step 608, e.g. keyboard, mouse, webcam. If it is not an HID device, then the flash memory storage device is in an inactive mode, via step 610. If it is set for an unmanaged hub, then the DOMC is bypassed, and the flash memory storage device is always in the active mode, via step 612.

When the management hub is first connected to a PC, the DOMC can be launched by clicking to the application, via step 614. If the application is closed by clicking the "X", via step 616, it checks to see if the flash memory storage device is busy, via step 618. If yes, it remains active in the system tray. If the device is not busy, then the application is closed, via step 620. Any flash memory storage devices that are connected to the management hub are displayed in the DOMC in the inactive state.

The DOMC shows all memory storage devices that are inserted into the management hub's ports. With the right click, via step 622, the drive capacity and usage is displayed. Inactive drives are displayed as gray, via step 628 (or any other colors). For each drive, the port number is displayed. The volume label is displayed in the name field. A portion of the drive description is displayed in the description field. The description is a memo field. Right clicking on the name in the DOMC allows the user to edit the name of the management hub, via step 630. This allows for easier management when multiple management hubs are connected to the same host PC. After the information has been changed, it will save the changes, via step 632, and update the status, via step 634, from the DOMC.

Any subsequent connections of a flash memory storage device to the management hub show the device as inactive and the DOMC is updated.

Whether the drive is active or inactive, the user is able to read and modify the drive volume and descriptive field through the DOMC.

Left clicking, via step 636, will display the detail of the drive information, via step 638.

Double clicking, via step 640, on any of the flash memory storage devices in the DOMC that are in the active state, via step 642, launches Windows Explorer, via step 644, to the corresponding device.

Advantages

The advantages are:

(1) Isolating each flash memory storage device in an "Inactive State" so it is only visible to the host PC through the "Drive Organizer Management Console (DOMC) from the management hub, thus blocking "OS" from the host PC from accessing the flash memory storage device.

(2) Allowing each Flash memory storage device to be placed in an "Active State" where the device can be enumerated by the host PC and accessed by any application such as Windows Explorer.

(3) Easily update and view the device name.

(4) Supporting a memo for adding description to each device. This memo is stored in the onboard memory and can be easily viewed and updated by the user. Each memo is uniquely associated to the corresponding flash memory storage device.

(5) Easily launch of Windows Explorer. Double clicking on any of the flash memory storage devices in the DOMC that are in the Active State will launch Windows Explorer to the corresponding device.

(6) The casing can also be used to store the management hub and at least one flash memory storage device.

While traditional hubs provide instance access to the user when the device is inserted into the hub, they cannot be managed individually in terms of ports. They also provide no privacy; thus data cannot be protected.

The management hub identifies multiple flash memory storage devices, and it can be managed when the flash memory storage device is inserted into the management hub. Users can decide when and which flash memory storage devices to launch, and also blocking "OS" from accessing the flash memory storage device upon insertion.

Although the present invention has been described in accordance with the embodiments shown, one of ordinary skill in the art will readily recognize that there could be variations to the embodiments and those variations would be within the spirit and scope of the present invention. The management hub in accordance with the present invention can be utilized with a variety of devices such as a cell phone, a PDA, a laptop and other types of integrated circuits. In addition, the ports can be any of a variety of ports such as USB, IEEE1394, PCMCIA, serial or the like. Accordingly, many modifications may be made by one of ordinary skill in the art without departing from the spirit and scope of the appended claims.

What is claimed is:

1. A management hub for identifying and controlling activation of one or more attached memory devices, comprising:

an interface for interfacing and communicating with one or more external host devices;

a master hub controller coupled to the interface;

a plurality of ports coupled to the master hub controller for receiving the one or more attached memory devices;

a microcontroller coupled to the master hub controller;

a slave hub controller coupled to the microcontroller and the plurality of ports; and an on-board flash memory device coupled to the microcontroller, the on-board flash memory device having a plurality of resident partitions including a hidden drive information partition and a hidden drive organizer partition for managing and identifying information in the one or more attached memory devices coupled to the plurality of ports, and control logic operative to activate a drive organizer management console (DOMC) application within the hidden drive organizer partition for actively determining when the one or more attached memory devices are attached to a port of the plurality of ports and preventing an operating system from the one or more external host devices from accessing the one or more attached memory devices, wherein when the management hub is first connected to a host system the DOMC is active and isolates each of the one or more attached memory devices and provides indication of each as being in an activation state to the host system in accordance with its status.

2. The management hub of claim 1 which includes a plurality of multiplexers coupled between the plurality of ports, the master hub controller and the slave hub controller.

3. The management hub of claim 2, wherein each of the multiplexer includes an LED, wherein each of the LEDs indicates whether the port is active.

4. The management hub of claim 3, wherein the port is active when the LED is illuminated in a first color; wherein the port is active when the LED is illuminated blinking in the first color; the port is inactive when the LED is illuminated in a second color and the LED is off when a drive is not present on the port.

5. The management hub of claim 1 wherein a plurality of management hubs can be coupled in a serial fashion to a port.

6. The management hub of claim 1 wherein a plurality of management hubs can be coupled to the plurality of ports in a parallel fashion.

7. The management hub of claim 1 includes a hub setting switch;
wherein when the switch is in a first position the hub is unmanaged and the drives are active and when the hub switch is in a second position the hub is managed and the drives that are inactive.

8. The management hub of claim 7 wherein the hub setting switch can be implemented in hardware or software.

* * * * *